US008360713B2

(12) United States Patent
Carosi et al.

(10) Patent No.: US 8,360,713 B2
(45) Date of Patent: Jan. 29, 2013

(54) WIND MANIPULATOR AND TURBINE

(76) Inventors: Claudio D Carosi, Mississauga (CA); Maria D Carosi, Mississauga (CA)

( * ) Notice: Subject to any disclaimer, the term of this patent is extended or adjusted under 35 U.S.C. 154(b) by 791 days.

(21) Appl. No.: 12/461,712

(22) Filed: Aug. 21, 2009

(65) Prior Publication Data

US 2010/0143096 A1 Jun. 10, 2010

Related U.S. Application Data

(60) Provisional application No. 61/190,694, filed on Aug. 21, 2008.

(51) Int. Cl.
*F03D 7/00* (2006.01)
(52) U.S. Cl. .......................................... 415/4.2; 416/176
(58) Field of Classification Search .................. 415/2.1, 415/3.1, 4.1, 4.2, 4.3, 4.4, 4.5, 191, 65, 905, 415/907, 908; 416/128, 198 R, 199, 203, 416/176
See application file for complete search history.

(56) References Cited

U.S. PATENT DOCUMENTS

| 268,292 | A | * | 11/1882 | Robinson | 416/175 |
| 377,602 | A | * | 2/1888 | Cooper | 415/155 |
| 634,664 | A | * | 10/1899 | Gates | 416/199 |
| 658,969 | A | * | 10/1900 | Walter | 416/84 |
| 1,248,305 | A | * | 11/1917 | Gallagher | 415/149.1 |
| 4,074,951 | A | * | 2/1978 | Hudson | 415/2.1 |
| 4,076,448 | A | * | 2/1978 | Sanders, Jr. | 415/198.1 |
| 4,236,866 | A | * | 12/1980 | Zapata Martinez | 415/4.4 |
| 4,269,563 | A | | 5/1981 | Sharak et al. | |
| 4,764,683 | A | | 8/1988 | Coombes | |
| 4,822,239 | A | | 4/1989 | Tsipov | |
| 6,638,005 | B2 | * | 10/2003 | Holter et al. | 415/4.2 |
| 6,674,181 | B2 | * | 1/2004 | Harbison | 290/55 |
| 6,952,058 | B2 | | 10/2005 | McCoin | |
| 7,056,082 | B1 | | 6/2006 | Taylor | |
| 7,241,105 | B1 | | 7/2007 | Vanderhye et al. | |
| 7,488,150 | B2 | | 2/2009 | Krippene | |
| 7,494,315 | B2 | | 2/2009 | Hart | |
| 7,874,787 | B2 | * | 1/2011 | Morris | 415/4.2 |
| 2002/0109358 | A1 | | 8/2002 | Roberts | |
| 2006/0032361 | A1 | | 2/2006 | Deschamps et al. | |
| 2006/0275105 | A1 | | 12/2006 | Roberts et al. | |
| 2009/0003999 | A1 | | 1/2009 | Whitworth et al. | |
| 2009/0155043 | A1 | | 6/2009 | Krippene | |
| 2009/0184521 | A1 | | 7/2009 | Chong | |
| 2009/0189395 | A1 | | 7/2009 | Ryynanen et al. | |
| 2009/0191057 | A1 | | 7/2009 | Knutson | |

FOREIGN PATENT DOCUMENTS

WO    WO 9813602    4/1998

* cited by examiner

*Primary Examiner* — Richard Edgar
*Assistant Examiner* — Ryan Ellis

(57) ABSTRACT

A vertical axis turbine machine for converting fluid flow into rotational energy and having a housing with an inlet, a turbine rotor having two spiral turbine blade sets, namely an upper blade set and a lower blade set, mounted on a common vertical axis in the housing, and in which the upper blade set twists in one direction and in which the lower blade set twists in the opposite direction, the upper and lower blade sets meeting at a central area of the rotor midway between top and bottom, and flow guides in the housing guiding incoming fluid flow onto the turbine rotor, and the rotor being surrounded by a plurality of impeller vanes extending vertically within the housing, and the housing having upper and lower outlet ducts, and outlets rearwardly of said housing.

14 Claims, 5 Drawing Sheets

WIND MANIPULATOR AND TURBINE

This application claims priority of the filing date of U.S. Provisional application Ser. No. 61/190,694, which was filed on the Aug. 21, 2008, title; Wind Manipulator and Turbine.

FIELD OF THE INVENTION

The invention relates to a wind and water machine in which fluid energy such as wind energy (or water flow) is converted into useful energy such as electrical energy, by flowing around a vertical turbine rotor. The turbine rotor comprises sets of upper and lower spiral turbine blades, arranged end to end on a common vertical axis. The blades form spirals around the central axis, with the upper set of blades twisting in one direction and with the lower set of blades twisting in the opposite direction to the upper set.

BACKGROUND OF THE INVENTION

Wind energy machines are proposed in a wide variety of designs. The simplest is a form of windmill, with several blades mounted on a hub like an aircraft propeller spinning on a horizontal axis. These suffer from known problems. They are unresponsive to low wind speeds, and are liable to overspeed and suffer damage at high wind speeds. They are also relatively tall structures and are unsightly.

The blade tips travel at high velocity, even when operating in modest winds. This tip speed may be close to the speed of sound. The noise of such windmill designs is well known and is a major disadvantage. Changing the direction in which the windmill is facing becomes difficult when the blades are rotating, due to the creation of kinetic energy of the rotating blades around their horizontal axis, which resists changes in direction.

Squirrel cage type systems are highly directional and are relatively inefficient. Vertical rotor designs require the wind direction to be diverted by as much as 90 degs, thus wasting considerable energy.

They do have certain features which are advantageous. Thus they are easily directed at the incoming wind. They can be lower then propeller type designs and thus less objectionable. They are less liable to overspeed in high winds and less liable to damage. The turbine blades can be shorter, thus avoiding problems of excessive tip speeds common to windmill systems.

Turbine designs however have been of various types. The typical turbine is a multi-blade disc somewhat like a fan, with the blades being twisted so as to convert wind energy into rotation as the air passes. This type of turbine is not suitable for a vertical turbine design.

Water turbines also suffer from numerous disadvantages, and the principles of the invention can be applied to water flows, as well as to fluid flows such as air flows. Accordingly it is desirable to design a turbine machine, using a vertical axis turbine rotor, and mounted in a housing which can be directed at the incoming wind.

BRIEF SUMMARY OF THE INVENTION

With a view to addressing these problems, the invention provides a vertical axis turbine machine having a housing with an air inlet, a turbine rotor comprising two spiral turbine blade sets, namely an upper blade set and a lower blade set, mounted on a common vertical axis in the housing, and in which the upper blade set twists in one direction and in which the lower blade set twists in the opposite direction, the upper and lower blade sets meeting at a central area of the rotor midway between top and bottom, and wind guides in the housing guiding incoming wind onto the turbine rotor, and the rotor being surrounded by a plurality of impeller vanes extending vertically within the housing, and the housing having upper and lower air outlet ducts, and air outlets rearwardly of said housing.

In one embodiment there may be only one turbine rotor in the housing, and only one upper and one lower opening.

In a preferred embodiment there are two turbine rotors, in one housing, mounted side by side, having an air inlet and two sets of wind guides, and two separate upper and lower air outlet ducts for the two turbine rotors.

In the preferred embodiment, a first turbine rotor has upper blades twisting in a first direction and lower blades twisting in a second direction opposite to the first, and a second turbine rotor has upper blades twisting in the second direction, and lower blades twisting in the first direction. In this way the two turbines will rotate in directions opposite to one another.

Preferably the housing is mounted on a base, and the housing is rotatable around the base.

The base and housing preferably have an annular mounting rail, and grooved wheels running on the annular rail, so as to be rotatable 360 degrees.

The housing has a plurality of wind entrance windows along one side, and shutters for opening and closing the windows.

The housing preferably has tail planes for responding to the wind and swinging the housing around so that the windows face the incoming wind. The tail planes are hollow and connected to the air outlet ducts. In this way air is ejected rearwardly via the air ducts and through the tail planes.

Within the housing there are a plurality of wind guides, formed around generally arcuate paths, for guiding incoming wind around and directing the wind onto the turbine rotor. Preferably the wind guides define spacing between them in which the spacing narrows progressively from the windows to the impeller vanes.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

IN THE DRAWINGS

DESCRIPTION OF A SPECIFIC EMBODIMENT

Figure 1:
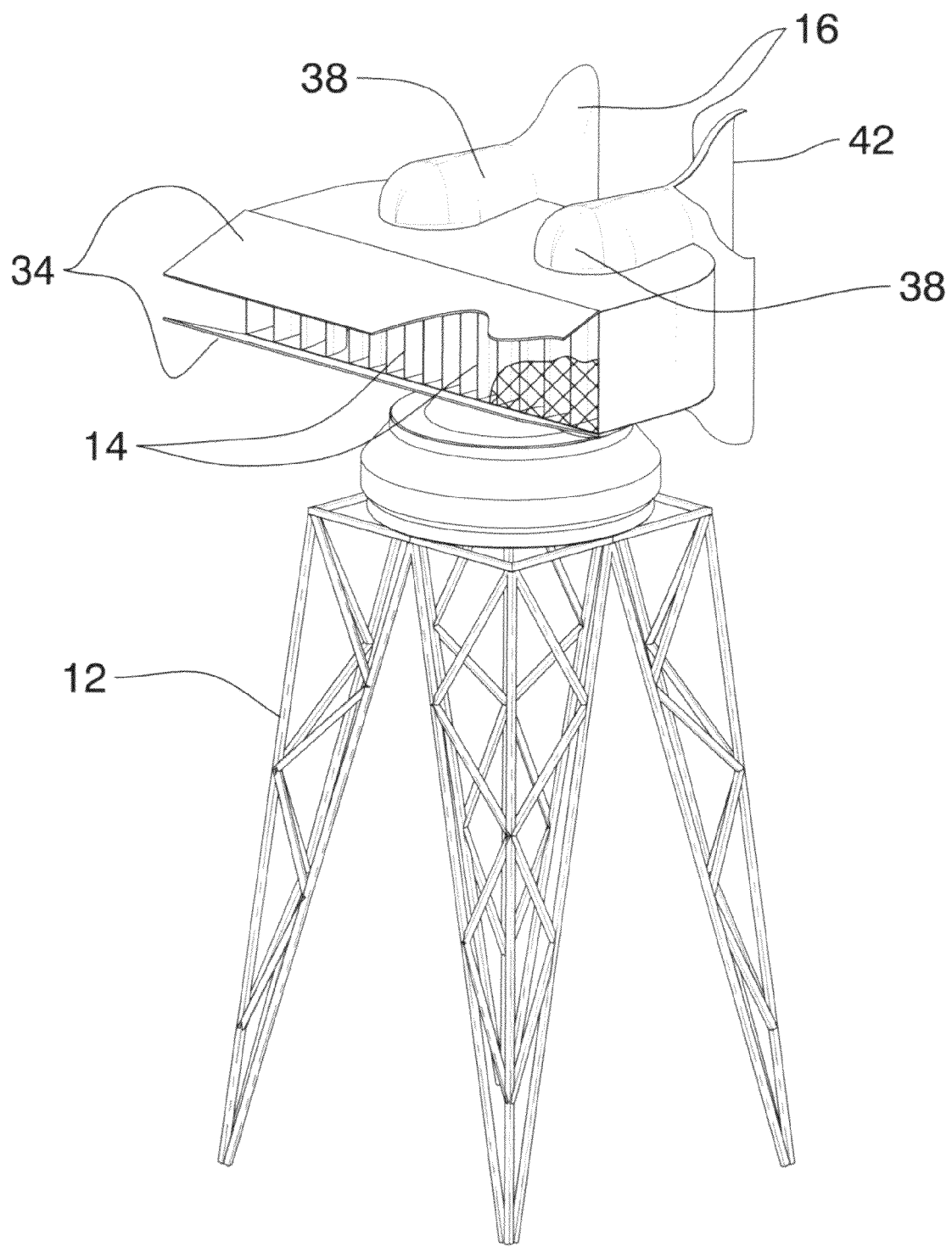
FIG. 1 is a perspective of a vertical axis turbine machine illustrating the invention, partially cut away.
Figure 2:
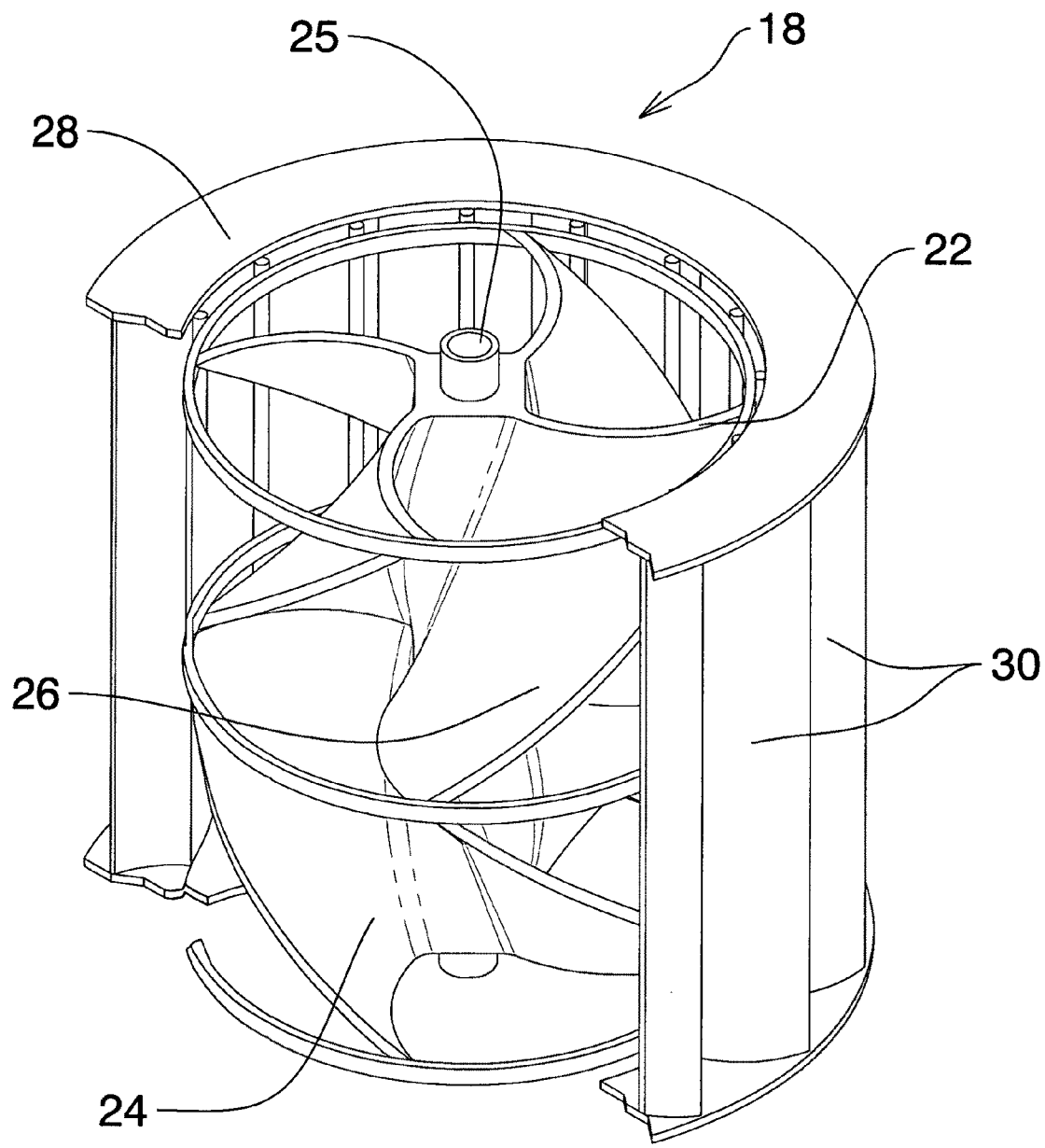
FIG. 2 is perspective of a turbine rotor, and impeller vanes.
Figure 3:
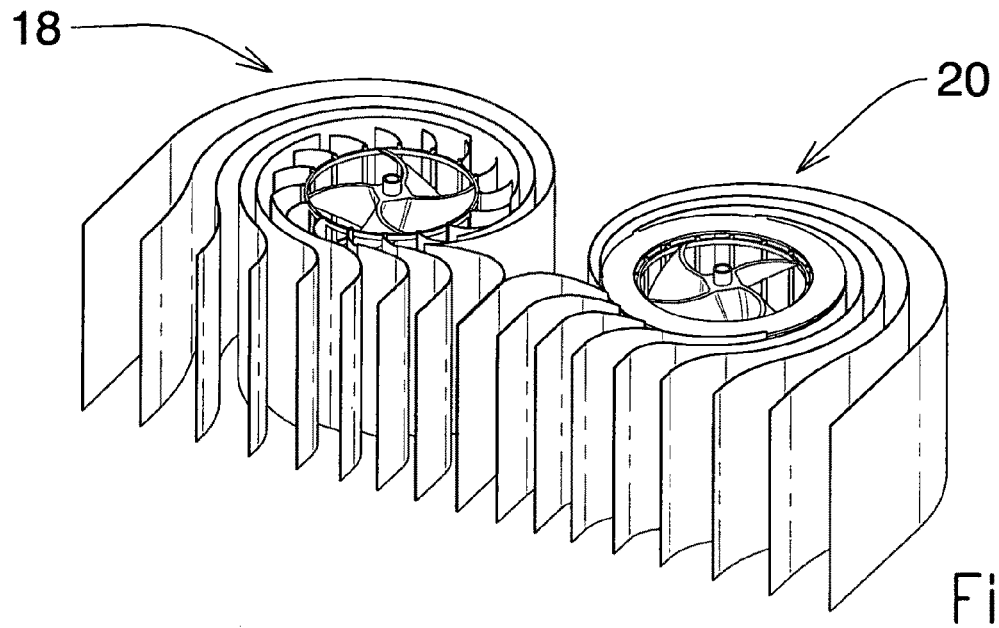
FIG. 3 is a perspective of two turbine rotors and two sets of wind guides.
Figure 4:
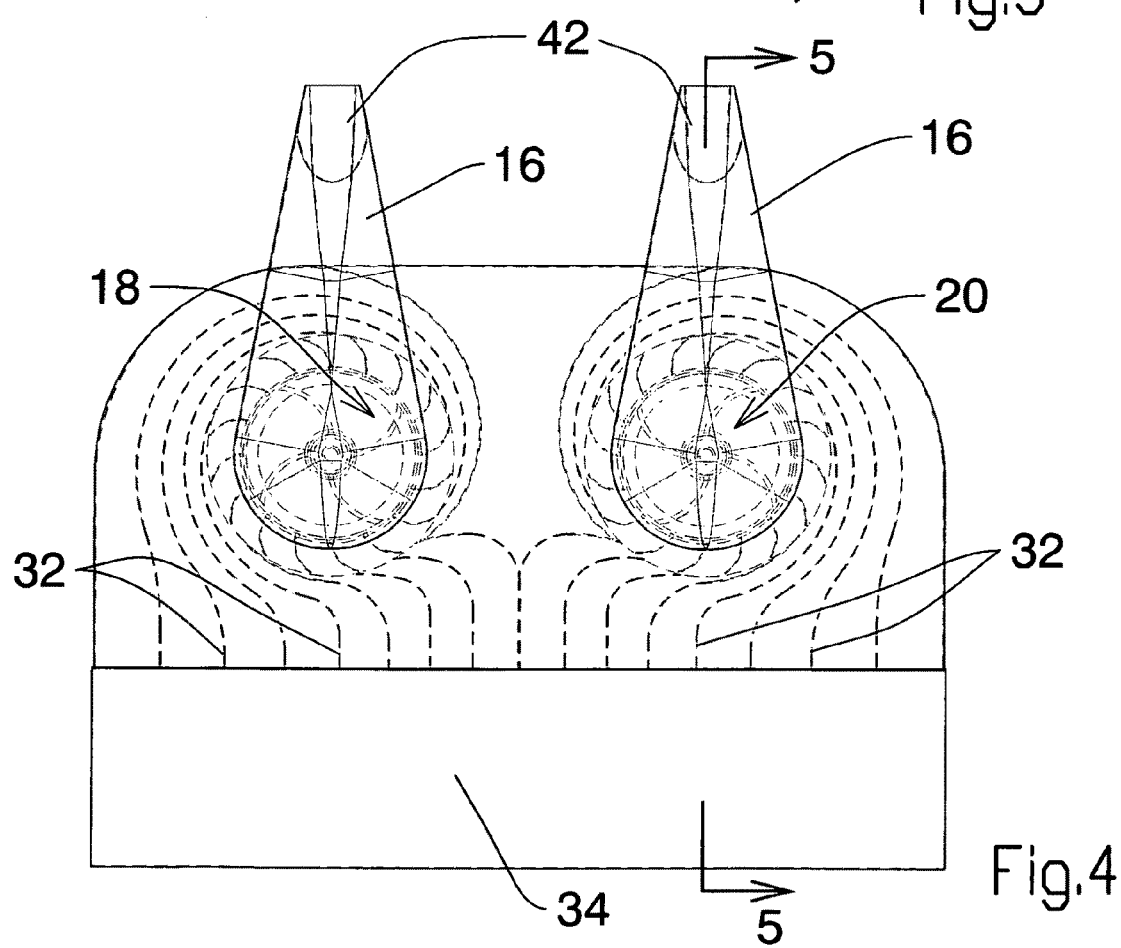
FIG. 4 is a top plan of FIG. 3.
Figure 5:
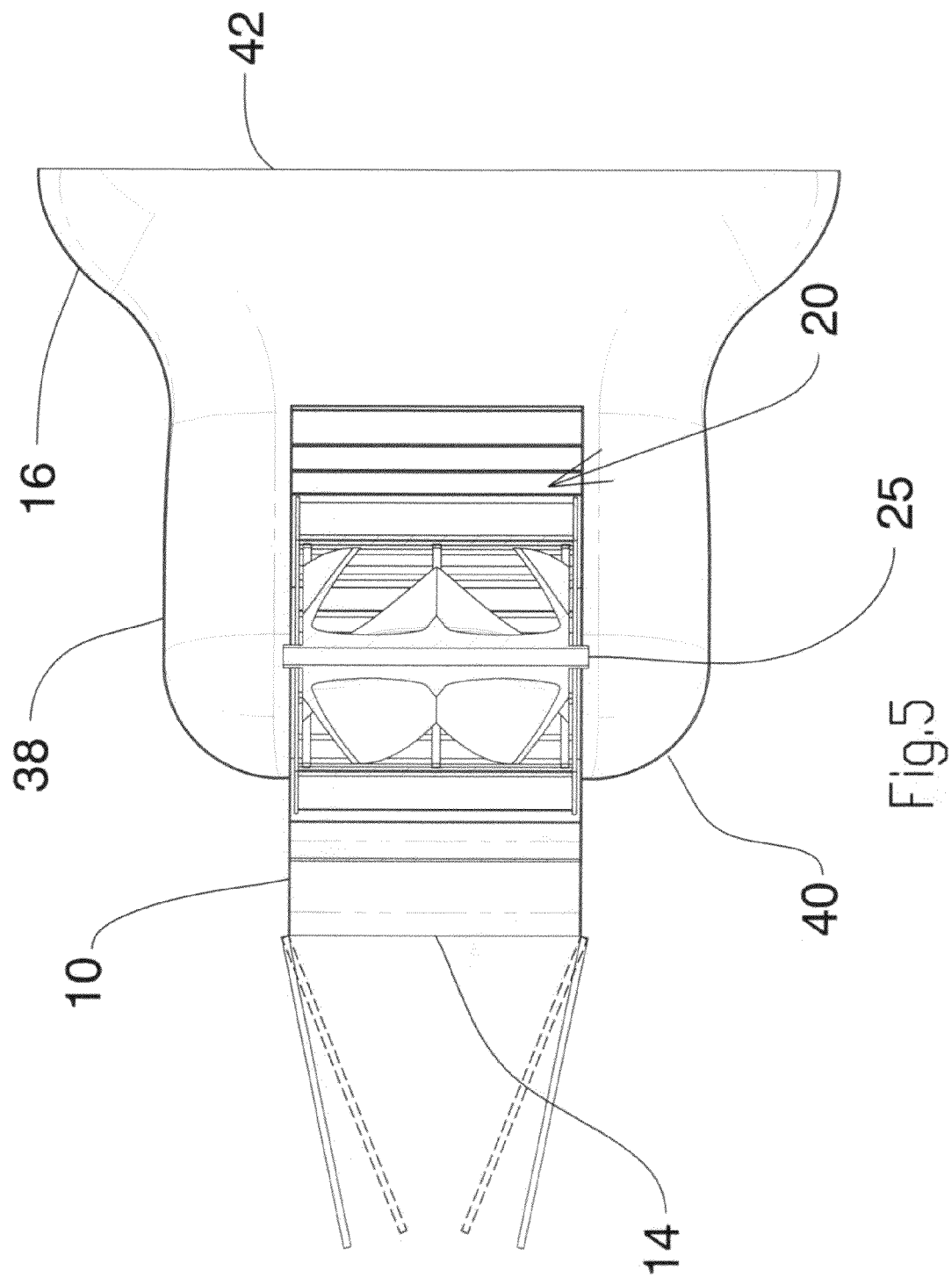
FIG. 5 is a section along 5-5 of FIG. 4.
Figure 6:
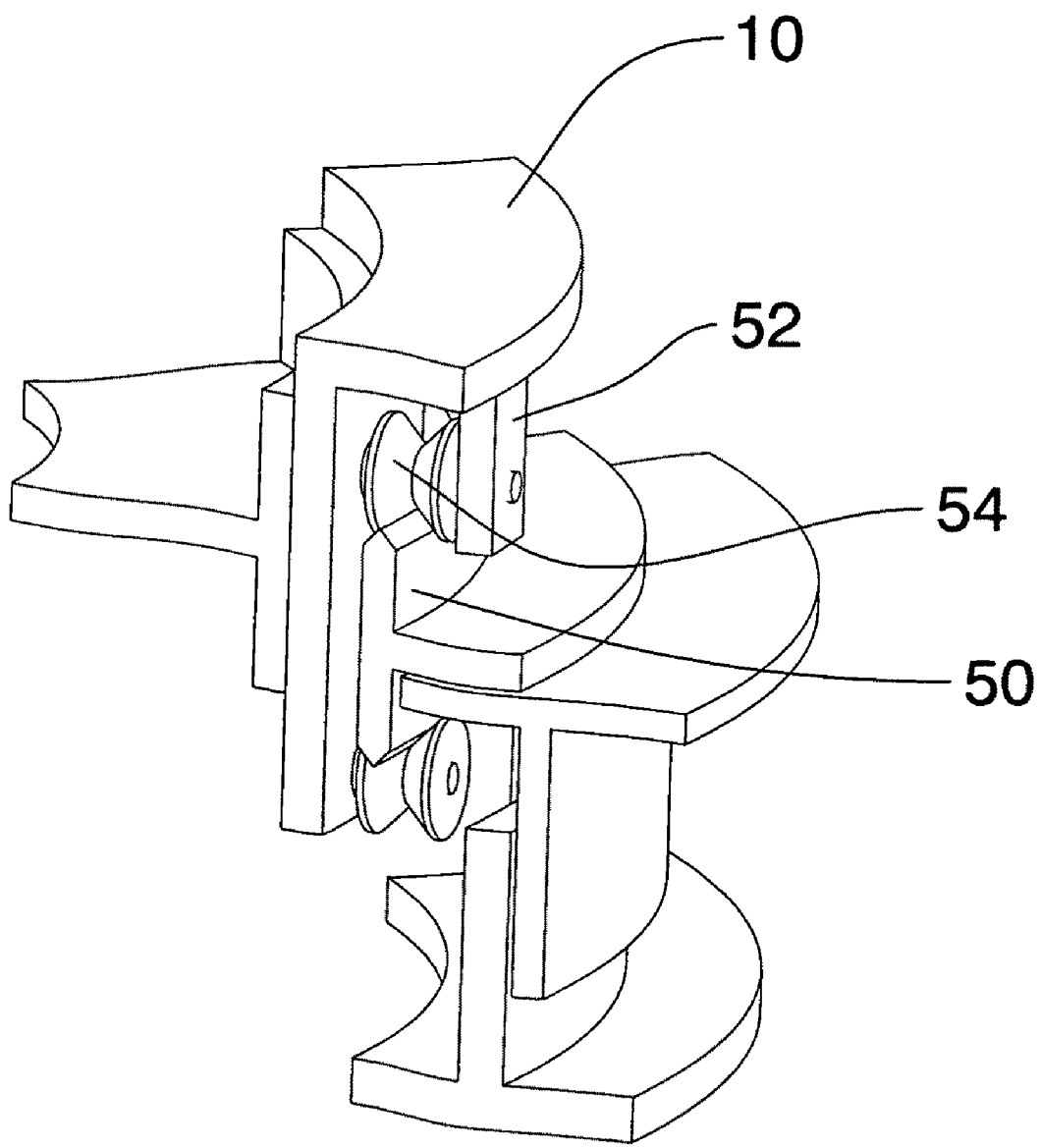
FIG. 6 is a section of the annular track and wheeled trolleys.

Referring now to FIGS. 1 and 2 it will be seen that the invention is illustrated in the form of a vertical axis wind machine for converting wind energy into rotational force.

A housing (10) is rotatably mounted on a base (12). Housing (10) has a rectangular opening defining an air inlet in the form of several wind entrance windows (14), in a side wall and has top and bottom walls A pair of tail planes (16) are mounted on the exterior of the housing. They act as weathervanes, to respond to the wind direction and swing the housing around to face into the incoming wind. The windows (14) will usually incorporate some kind of screens (not shown) to prevent birds or objects from entering the housing.

Within housing (10) there are, in this embodiment, two turbine rotors (18) and (20) Each turbine rotor comprises two spiral turbine blade sets, namely an upper blade set (22) and a lower blade set (24), mounted on a common vertical axis shaft (25) and defining a top and a bottom.

The upper blade set (22) twists in one direction and the lower blade set (24) twists in the opposite direction. The upper and lower blade sets meet at a central zone (26) of the rotor midway between top and bottom of said turbine rotor. The rotor blades extend away from the central zone upwardly and downwardly in spirals.

The blade sets on the one rotor (18) twist in opposite directions from the blade sets in the other rotor (20). In this way the rotors will spin in opposite directions.

The rotor shafts (25) are mounted in suitable bearings (not shown) in the housing. Each rotor is attached, along the edges of their upper and lower blade sets, to upper and lower annular plates (28). A plurality of vertical impeller vanes (30) are secured between plates (28). Impeller vanes (30) are generally arcuate in profile, and are mounted at spaced intervals around plates (28) in a generally radial manner. Spaces are defined between vanes (30) for flow of air.

Within the housing there are several wind guides (32) guiding incoming wind onto the turbine rotors. The wind guides extend from the window (14) and curve around within the housing and end at impeller vanes (30). The wind guides carry the incoming wind right around the vanes (30) so that the wind impacts onto all the impeller vanes as far as possible around as much of the 360 degree circumference as can be covered.

The housing has a plurality of wind entrance windows (14) along one side, and shutters (34) for opening and closing the entrance windows (14).

As explained above, in this embodiment of the invention there are two turbine rotors (18) and (20) mounted in the one housing (10), mounted side by side, on parallel spaced apart vertical axes.

There are two upper (38) and two lower (40) air outlet ducts on the top and bottom walls of the housing. Upper ducts (38) register with the upper blade sets of respective turbine blades and lower ducts register with the lower blade sets of respective turbine blade sets. The ducts connect with the tail planes (16). The tail planes are themselves hollow, as at (42) FIG. 1, and act as exits venting the air to flow out of the housing through the ducts (38) and (40) rearwardly in a generally horizontal direction.

In order to provide for 360 degree rotation of the housing (10), the base (12) has an annular mounting rail (50), and the housing (10) has trolleys (52) having grooved wheels (54) running on the annular rail (50).

There are two sets of wind guides (32) within the housing (10). They are formed around generally arcuate paths, curving in opposite directions. In this way they guide incoming wind around each turbine rotor.

In this way the wind striking the one rotor is directed in a direction opposite to the wind striking the other rotor.

The wind guides define spacings between them which spacing narrows progressively from the entrance windows to the turbine rotor itself.

In operation wind will flow in at the windows, and flow around the wind guides. The wind will then flow onto the impeller vanes and flow up or down the turbine rotor blades. As wind strikes the impeller vanes it will cause rotation of the turbine. The wind flow will then divide into a downward flow and an upward flow. Air flows over the impeller vanes, and over the turbine blades will rotate the turbine shafts, and generate rotary force.

This force can then be applied to, for example, generation of electricity, pumping water, or even driving machinery such as a mill or the like, the details of which are, well known per se.

The details of such equipment are known per se and are omitted for the sake of clarity. If the wind becomes too strong the shutters can be partially or even completely closed. Other forms of shutters can be used such as sliding shutters, roller shutters or the like, without altering the invention.

The plates (28) serve to control incoming wind flow and prevent it from diverting directly to the outlet.

Similar principles can also be applied to deriving rotary force from a water stream.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A vertical axis turbine machine for converting fluid energy into rotational force and comprising;
   a housing defining a side wall and top and bottom walls;
   at least one turbine rotor in said housing said rotor comprising;
   two spiral turbine rotor blade sets, namely an upper spiral blade set and a lower spiral blade set, mounted on a common vertical axis and said turbine rotor defining upper and lower ends;
   wherein the upper spiral blade set twists in one direction and wherein the lower spiral blade set twists in the opposite direction, the upper and lower spiral blade sets meeting at a centre point of the turbine rotor midway between said upper and lower ends of said turbine rotor;
   a plurality of impeller vanes mounted radially around said turbine rotor;
   inlet openings in said housing side wall;
   at least one set of fluid guides guiding incoming fluid onto said impeller vanes and said turbine rotor, the fluid flow then flowing upwardly and downwardly around respective upper and lower blade sets; and,
   a top, fluid flow outlet duct on said top wall and a bottom fluid flow outlet duct on said bottom wall at respective upper and lower ends of the turbine rotor said outlet ducts registering with respective upper and lower blade sets of said turbine rotor for receiving upward and downward fluid flow exiting from respective upper and lower spiral blade sets of said turbine rotor.

2. A vertical axis turbine machine as claimed in claim 1 and wherein said upper and lower blades sets are of equal radius from the centre of the turbine rotor, around their respective spirals.

3. A vertical axis turbine machine as claimed in claim 1 wherein there is one turbine rotor in the housing and one set of flow guides and one upper and one lower air outlet.

4. A vertical axis turbine machine as claimed in claim 1 wherein there are two turbine rotors in one housing, mounted side by side, and two separate sets of impeller vanes surrounding the two turbine rotors, and two sets of flow guides, and two upper and two lower air outlets.

5. A vertical axis turbine machine as claimed in claim 4 wherein there is a first turbine rotor having first rotor upper blades twisting in a first direction and first rotor lower blades twisting in a second direction opposite to the first direction, and a second turbine rotor having second upper blades twisting in the second direction, and lower rotor blades twisting in the first direction, whereby the first and second turbine rotors will rotate in directions opposite to one another.

6. A vertical axis turbine machine as claimed in claim 1 wherein said housing is mounted on a base, and the housing is rotatable around the base.

7. A vertical axis turbine machine as claimed in claim 6 wherein said base and housing have an annular mounting rail, and grooved wheels running on the annular rail.

8. A vertical axis turbine machine as claimed in claim 1 wherein the fluid flow is wind and wherein said housing has a plurality of wind entrance windows along one side, and shutters for opening and closing the entrance windows.

9. A vertical axis turbine machine as claimed in claim 8 wherein said housing has exterior tail planes for responding to the wind and guiding the housing so that the windows face the incoming wind.

10. A vertical axis turbine machine as claimed in claim 1 wherein said flow guides within said housing extend from said windows to said turbine and are formed around generally arcuate paths, for guiding incoming fluid around the turbine rotor, and annular plates secured to the upper and lower turbine blades, and said impeller vanes being secured between said annular plates.

11. A vertical axis turbine machine as claimed in claim 10 wherein said flow guides define spacing between them in which the spacing narrows progressively from said windows to the turbine.

12. A vertical axis turbine machine as claimed in claim 11 wherein said tail planes are hollow and define fluid flow ducts connected to receive flow from said upper and lower outlets ducts and directed said rearwardly of said housing.

13. A vertical axis turbine machine as claimed in claim 12 wherein said air outlet ducts on the top and bottom of said housing, are connected with said tail planes.

14. A vertical axis wind machine comprising;
- a housing having a side wall and top and bottom walls mounted, on a base, and the housing being rotatable around the base;
- two turbine rotors in said housing each turbine rotor consisting of two spiral turbine rotor blade sets, namely an upper blade set and a lower blade set, mounted on a common vertical axis and defining a top and a bottom;
- wherein the upper blade set twists in one direction and wherein the lower blade set twists in the opposite direction, the upper and lower blade sets meeting at a centre point of the rotor midway between top and bottom of said turbine rotor;
- and wherein a first turbine rotor has upper blades twisting in a first direction and lower blades twisting in a second direction opposite to the first, and a second turbine rotor has an upper blade set twisting in the second direction, and in which the lower blade sets twist in the first direction, whereby the first and second turbine rotors will rotate in directions opposite to one another;
- respective upper and lower annular plates attached to respective turbine rotors;
- impeller vanes extending vertically between said annular plates, within the housing;
- air inlet windows in said housing;
- wind guides in said housing extending from said windows and guiding incoming wind onto respective turbines, wherein said wind guides are formed around arcuate shapes and define spacing between them in which the spacing narrows progressively from the inlet windows to the impeller vanes;
- air ducts on respective top and bottom walls of said housing, registering with the upper and lower ends of the turbines; and
- tail planes at the rear of said housing, said tail planes defining a hollow interior, and said air ducts communicating with said tail planes, whereby air exiting from said turbine rotors will flow through said air ducts and then out through said tail planes rearwardly of said housing.

* * * * *